US012638543B2

(12) United States Patent
Das

(10) Patent No.: US 12,638,543 B2
(45) Date of Patent: May 26, 2026

(54) GENERAL AND ROBUST DISTRIBUTED LINEAR FILTERING AND PREDICTION WITH OPTIMAL GAIN

(71) Applicant: INTERNATIONAL BUSINESS MACHINES CORPORATION, Armonk, NY (US)

(72) Inventor: Subhro Das, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 18/117,181

(22) Filed: Mar. 3, 2023

(65) Prior Publication Data

US 2024/0302486 A1 Sep. 12, 2024

(51) Int. Cl.
*G01S 5/02* (2010.01)

(52) U.S. Cl.
CPC ............ *G01S 5/0294* (2013.01); *G01S 5/021* (2013.01)

(58) Field of Classification Search
CPC . G01S 5/0294; G01S 5/02; G01S 5/00; G01S 5/021; G01S 5/0205; G06N 7/00
See application file for complete search history.

(56) References Cited

U.S. PATENT DOCUMENTS

| | | | |
|---|---|---|---|
| 9,633,315 B2 | 4/2017 | Chapelle et al. | |
| 9,984,337 B2 | 5/2018 | Kadav et al. | |
| 11,252,260 B2 | 2/2022 | Xie et al. | |
| 11,455,573 B2 | 9/2022 | Das | |
| 2021/0092571 A1* | 3/2021 | Shibuya | .................... H04B 1/59 |
| 2021/0160042 A1* | 5/2021 | Sugata | .................. H04L 7/0033 |
| 2022/0085975 A1 | 3/2022 | Manamohan et al. | |

(Continued)

FOREIGN PATENT DOCUMENTS

| | | | | |
|---|---|---|---|---|
| CN | 113010305 | 6/2021 | | |
| WO | 201758348 | 4/2017 | | |
| WO | WO-2023097022 A1 * | 6/2023 | ............... | G06F 1/26 |

OTHER PUBLICATIONS

Das et al., "Consensus+Innovations Distributed Kalman Filter With Optimized Gains", IEEE Transactions On Signal Processing, vol. 65, No. 2, Jan. 15, 2017; pp. 467-481.

(Continued)

*Primary Examiner* — Mohamed Charioui

(74) *Attorney, Agent, or Firm* — Seed Intellectual Property Law Group LLP

(57) ABSTRACT

In one aspect of the invention, there is a computer-implemented method including: detecting, by a processor set of a first sensor agent, sensor data from one or more sensors comprised in the first sensor agent; determining, by the processor set, an own series of estimates, based on the sensor data; transmitting, by the processor set, the own series of estimates; receiving, by the processor set, at least one additional series of estimates from additional sensor agents; restoring, by the processor set, in response to detecting that a second sensor agent of the additional sensor agents has become disconnected and then re-connected, the transmitting of the series of estimates to the second sensor agent and the receiving of the series of estimates from the second sensor agent; and outputting, by the processor set, based on the own series of estimates and the additional series of estimates, a series of consensus estimates.

20 Claims, 4 Drawing Sheets

(56) References Cited

U.S. PATENT DOCUMENTS

2022/0101480 A1    3/2022 Kalamkar et al.

OTHER PUBLICATIONS

McMahan et al., "Federated Learning: Collaborative Machine Learning without Centralized Training Data", https://ai.googleblog.com/2017/04/federated-learning-collaborative.html, Apr. 6, 2017; 6 Pages.

Das, Grace Period Disclosure: "On Observability and Optimal Gain Design for Distributed Linear Filtering and Prediction", https://arxiv.org/pdf/2203.03521.pdf, Mar. 7, 2022; 8 Pages.

Das, "On Observability and Optimal Gain Design for Distributed Linear Filtering and Prediction", Proceedings of EUSIPCO 2022; Downloaded Jan. 9, 2023; pp. 1846-1850.

Carli et al., "Distributed Kalman filtering based on consensus strategies", IEEE Journal on Selected Areas in Communications, Apr. 25, 2008, pp. 622-633.

Casbeer et al., "Distributed information filtering using consensus filters", 2009 American Control Conference, Jun. 10-12, 2009, pp. 1882-1887.

Cattivelli et al., "Diffusion Strategies for Distributed Kalman Filtering and Smoothing", IEEE Transactions on Automatic Control, Feb. 17, 2010, pp. 2069-2084.

Chee-Yee Chong, "Forty years of distributed estimation: A review of noteworthy developments", 2017 Sensor Data Fusion: Trends, Solutions, Applications (SDF), Oct. 2017, 10 pages.

Das et al., "Distributed Estimation of Dynamic Fields Over Multi-agent Networks", arXiv:1701.02710v1 [cs.IT], Jan. 10, 2017, 2 pages.

Das et al., "Distributed Kalman filtering and network tracking capacity", 2013 Asilomar Conference on Signals, Systems and Computers, Nov. 2013.

Das et al., "Distributed Kalman Filtering With Dynamic Observations Consensus", IEEE Transactions on Signal Processing, Apr. 17, 2015, pp. 4458-4473.

Das et al., "Distributed Kalman filtering", 21st European Signal Processing Conference (EUSIPCO 2013), Sep. 2013, 5 pages.

Das et al., "Distributed linear estimationof dynamic random fileds", 2013 51st Annual Allerton Conference on Communication, Control, and Computing (Allerton), Oct. 2013, pp. 1120-1125.

Das et al., "Distributed linear filtering and prediction of time-varying random fields", Carnegie Mellon University, Thesis, Jun. 23, 2016, 132 pages.

Das et al., "Distributed state estimation in multi-agent networks", 2013 IEEE International Conference on Acoustics, Speech and Signal Processing, May 2013, pp. 4246-4250.

Dimakis et al., "Gossip Algorithms for Distributed Signal Processing", arXiv:1003.5309v1 [cs.DC], Mar. 27, 2010, 29 pages.

Ding et al., "A Survey on Model-Based Distributed Control and Filtering for Industrial Cyber-Physical Systems", IEEE Transactions on Industrial Informatics, Mar. 15, 2019, pp. 2483-2499.

Doostmohammadian et al., "On the Genericity Properties in Distributed Estimation: Topology Design and Sensor Placement", IEEE Journal of Selected Topics in Signal Processing, Feb. 8, 2013, pp. 195-204.

Fan RK Chung, "Lectures on Spectral Graph Theory", https://mathweb.ucsd.edu/~fan/research/cbms.pdf, 1997, 25 pages.

Ghai et al., "A Regret Minimization Approach to Multi-Agent Control", arXiv:2201.13288v3 [math.OC], Feb. 25, 2022, 13 pages.

He et al., "Distributed Design of Robust Kalman Filters Over Corrupted Channels", IEEE Transactions on Signal Processing, Apr. 5, 2021, pp. 2422-2434.

Howard et al., "An Optimal Kalman-Consensus Filter for Distributed Implementation Over a Dynamic Communication Network", IEEE Access , May 3, 2021, pp. 66696-66706.

Kar et al., "Gossip and distributed Kalman filtering: Weak consensus under weak detectability", IEEE Transactions on Signal Processing, Apr. 1, 2011, pp. 1766-1784.

Khan et al., "Coordinated networked estimation strategies using structured systems theory", 2011 50th IEEE Conference on Decision and Control and European Control Conference, Dec. 2011, pp. 2112-2117.

Khan et al., "Distributing the Kalman Filter for Large-Scale Systems", IEEE Transactions on Signal Processing, arXiv:0708.0242v2 [cs.IT], Feb. 25, 2008, 30 pages.

Khan et al., "Networked estimation under information constraints", arXiv:1111.4580v1 [cs.IT], Nov. 19, 2011, 32 pages.

Li et al., "Cooperative Field Prediction and Smoothing via Covariance Intersection", IEEE Transactions on Signal Processing, Jan. 8, 2021, pp. 797-808.

Li et al., "Distributed Kalman Filtering Over Massive Data Sets: Analysis Through Large Deviations of Random Riccati Equations", IEEE Transactions on Information Theory, Jan. 9, 2015, pp. 1351-1372.

Park et al., "An augmented observer for the distributed estimation problem for LTI systems", 2012 American Control Conference (ACC), Jun. 2012, pp. 6775-6780.

R. E. Kalman, "New results in linear filtering and prediction theory", https://asmedigitalcollection.asme.org/fluidsengineering/article-abstract/83/1/95/426820/New-Results-in-Linear-Filtering-and-Prediction?redirectedFrom=fulltext, Mar. 1961, pp. 95-108.

Reza Olfati-Saber, "Distributed Kalman Filter with Embedded Consensus Filters", Proceedings of the 44th IEEE Conference on Decision and Control, Dec. 2005, 6 pages.

Reza Olfati-Saber, "Distributed Kalman filtering for sensor networks", 2007 46th IEEE Conference on Decision and Control, Dec. 2007, pp. 5492-5498.

Reza Olfati-Saber, "Kalman-Consensus Filter : Optimality, stability, and performance", Proceedings of the 48h IEEE Conference on Decision and Control (CDC) held jointly with 2009 28th Chinese Control Conference, Dec. 2009, 7 pages.

Ribeiro et al., "Kalman Filtering in Wireless Sensor Networks", IEEE Control Systems Magazine, Mar. 25, 2010, pp. 66-86.

Rudolph Emil Kalman, "A New Approach to Linear Filtering and Prediction Problems", https://asmedigitalcollection.asme.org/fluidsengineering/article-abstract/82/1/35/397706/A-New-Approach-to-Linear-Filtering-and-Prediction?redirectedFrom=fulltext, Journal of Basic Engineering, Mar. 1960, pp. 35-45.

Savas et al., "On distributed linear filtering with noisy communication", 2017 American Control Conference (ACC), May 2017, pp. 2699-2704.

Schizas, "Consensus in ad hoc WSNs with noisy links—Part II: Distributed estimation and smoothing of random signals", IEEE Transactions on Signal Processing, Mar. 14, 2008, pp. 1650-1666.

Sebastian et al., "All-in-one: Certifiable Optimal Distributed Kalman Filter under Unknown Correlations", arXiv:2105.15061v3 [eess.SY], Jun. 13, 2022, 7 pages.

Yan et al., "Feedback-based target localization in underwater sensor networks: A multisensor fusion approach", IEEE Transactions on Signal and Information Processing over Network, Aug. 19, 2018, pp. 168-180.

Zhang et al., "Distributed filtering for switched linear systems with sensor networks in presence of packet dropouts and quantization", IEEE Transactions on Circuits and Systems I: Regular Papers, May 6, 2017, pp. 2783-2796.

\* cited by examiner

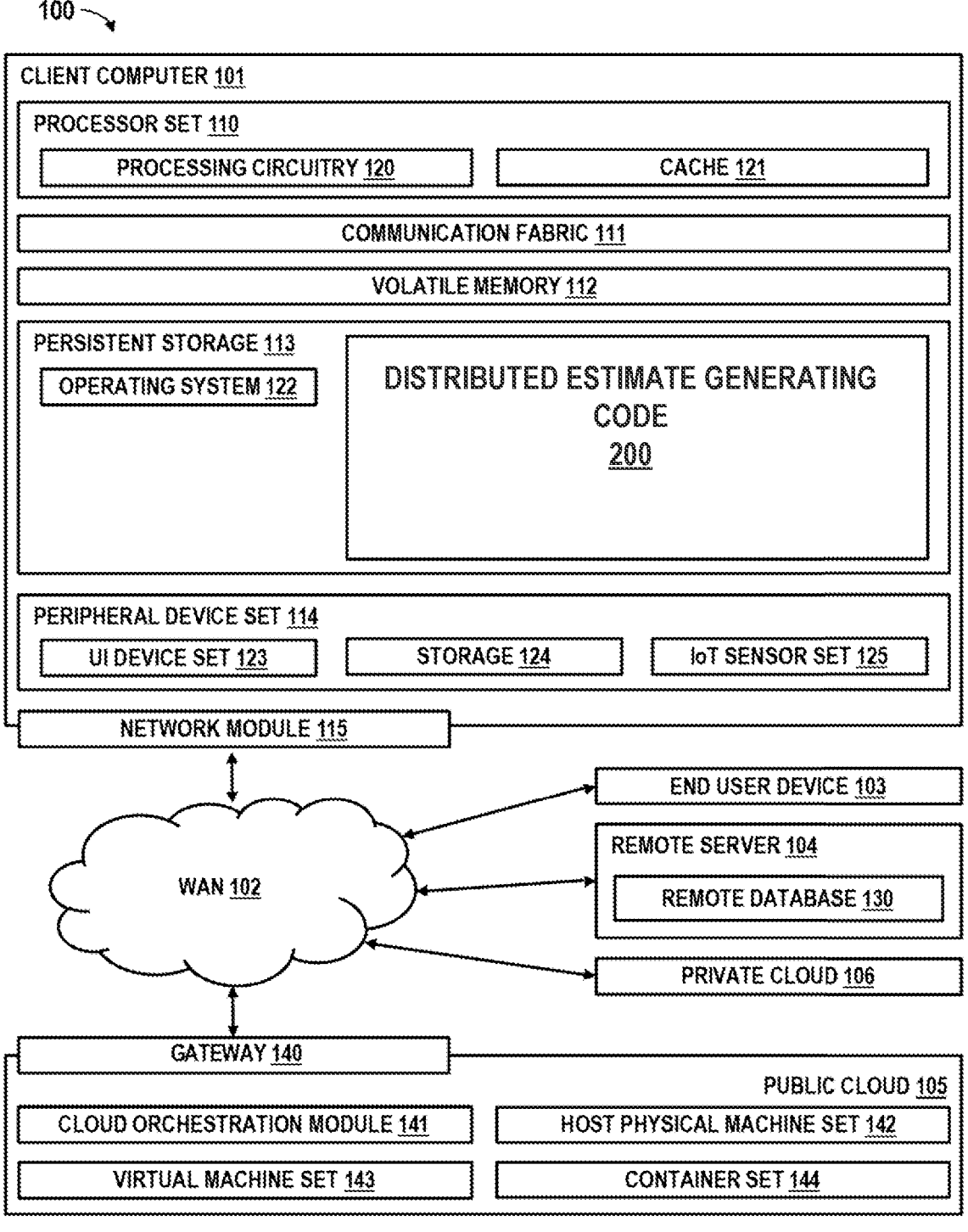

100

CLIENT COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

DISTRIBUTED ESTIMATE GENERATING
CODE
200

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

FIG. 1

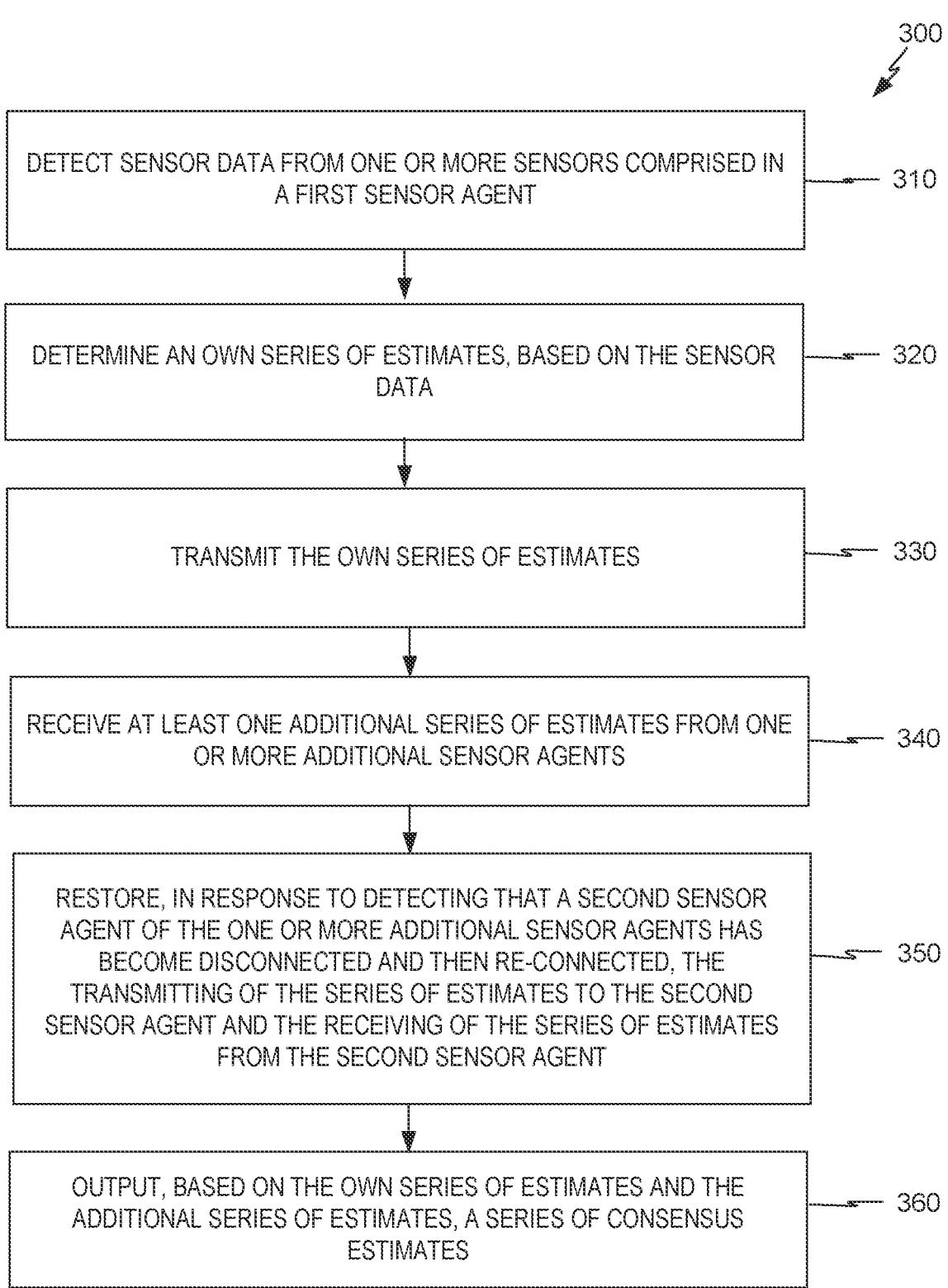

300

DETECT SENSOR DATA FROM ONE OR MORE SENSORS COMPRISED IN A FIRST SENSOR AGENT — 310

DETERMINE AN OWN SERIES OF ESTIMATES, BASED ON THE SENSOR DATA — 320

TRANSMIT THE OWN SERIES OF ESTIMATES — 330

RECEIVE AT LEAST ONE ADDITIONAL SERIES OF ESTIMATES FROM ONE OR MORE ADDITIONAL SENSOR AGENTS — 340

RESTORE, IN RESPONSE TO DETECTING THAT A SECOND SENSOR AGENT OF THE ONE OR MORE ADDITIONAL SENSOR AGENTS HAS BECOME DISCONNECTED AND THEN RE-CONNECTED, THE TRANSMITTING OF THE SERIES OF ESTIMATES TO THE SECOND SENSOR AGENT AND THE RECEIVING OF THE SERIES OF ESTIMATES FROM THE SECOND SENSOR AGENT — 350

OUTPUT, BASED ON THE OWN SERIES OF ESTIMATES AND THE ADDITIONAL SERIES OF ESTIMATES, A SERIES OF CONSENSUS ESTIMATES — 360

FIG. 3

GENERAL AND ROBUST DISTRIBUTED LINEAR FILTERING AND PREDICTION WITH OPTIMAL GAIN

STATEMENT REGARDING PRIOR DISCLOSURES BY THE INVENTOR OR A JOINT INVENTOR

The following disclosure(s) are submitted under 35 U.S.C. 102(b)(1)(A): DISCLOSURES: "On observability and optimal gain design for distributed linear filtering and prediction," Das (i.e. the identical sole inventor of the present disclosure), submitted to the arxiv.org pre-print server, Mar. 7, 2022, 8 pages; listed in and provided with IDS.

BACKGROUND

Aspects of the present invention relate generally to linear filtering and prediction and, more particularly, to linear filtering and prediction of noisy, time-varying random fields with distributed processing.

The Kalman filter is a widely used solution for linear filtering and prediction of time-varying random fields observed with noisy measurements, in a centralized processing context.

The growing need for data privacy and robustness from centralized server failure has led to the development of filtering and predictions algorithms that are subject to distributed processing rather than centralized processing, and thus are outside the context of a centralized Kalman filter.

SUMMARY

In a first aspect of the invention, there is a computer-implemented method including: detecting, by a processor set of a first sensor agent, sensor data from one or more sensors comprised in the first sensor agent; determining, by the processor set, an own series of estimates, based on the sensor data; transmitting, by the processor set, the own series of estimates; receiving, by the processor set, at least one additional series of estimates from one or more additional sensor agents; restoring, by the processor set, in response to detecting that a second sensor agent of the one or more additional sensor agents has become disconnected and then re-connected, the transmitting of the series of estimates to the second sensor agent and the receiving of the series of estimates from the second sensor agent; and outputting, by the processor set, based on the own series of estimates and the additional series of estimates, a series of consensus estimates.

In another aspect of the invention, there is a computer program product including one or more computer readable storage media having program instructions collectively stored on the one or more computer readable storage media. The program instructions are executable to: detect sensor data from one or more sensors comprised in a first sensor agent; determine an own series of estimates, based on the sensor data; transmit the own series of estimates; receive at least one additional series of estimates from one or more additional sensor agents; restore, in response to detecting that a second sensor agent of the one or more additional sensor agents has become disconnected and then re-connected, the transmitting of the series of estimates to the second sensor agent and the receiving of the series of estimates from the second sensor agent; and output, based on the own series of estimates and the additional series of estimates, a series of consensus estimates.

In another aspect of the invention, there is a system including a processor set, one or more computer readable storage media, and program instructions collectively stored on the one or more computer readable storage media. The program instructions are executable to: detect sensor data from one or more sensors comprised in a first sensor agent; determine an own series of estimates, based on the sensor data; transmit the own series of estimates; receive at least one additional series of estimates from one or more additional sensor agents; restore, in response to detecting that a second sensor agent of the one or more additional sensor agents has become disconnected and then re-connected, the transmitting of the series of estimates to the second sensor agent and the receiving of the series of estimates from the second sensor agent; and output, based on the own series of estimates and the additional series of estimates, a series of consensus estimates.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 1 depicts a computing environment in accordance with aspects of the present invention.

FIG. 3 depicts a flowchart of an exemplary method in accordance with aspects of the present invention.

DETAILED DESCRIPTION

Figure 2:
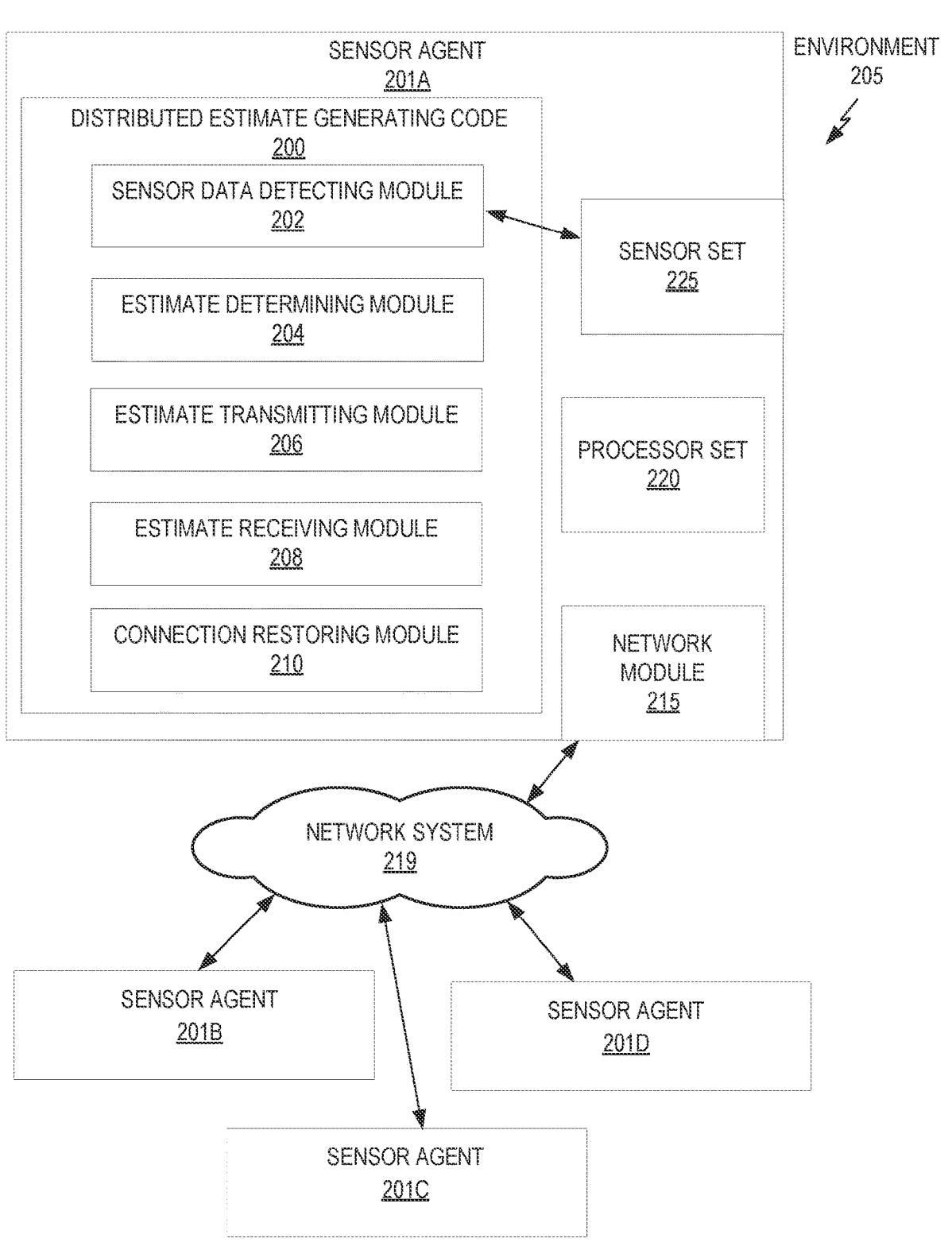
FIG. 2 depicts a block diagram of an exemplary environment in accordance with aspects of the present invention.

Aspects of this disclosure relate generally to a novel approach to distributed linear filtering and prediction and, more particularly, to observing and making consistently accurate predictions about random dynamical systems and environments observed by a multi-agent network of sensor agents. According to aspects of the invention, the sensor agents may be devices configured with one or more processing devices, one or more sensors, and one or more communication components. In various embodiments, the sensor agents may thus be configured to sense and detect at least one form of data from their environment and surroundings, perform processing for linear filtering and prediction to generate estimates of one or more states of interest based on their sensor data, transmit their estimates, and receive estimates transmitted by neighboring sensor agents of the multi-agent network within a transmission range of the communication components. In this manner, implementations of the present invention may provide a generalized and robust system for observing and making predictions about random dynamical systems and environments with consistent accuracy, in applications such as multi-agent control, positioning, navigation, state estimation in electrical power generating infrastructure (e.g., solar farms and wind farms) and electrical power grid distribution infrastructure (e.g., relay stations and power lines), spatio-temporal environment or field monitoring, connected vehicular network for traffic balancing and collision avoidance (for automobiles, bicycles, alternative ground transportation vehicles, aircraft, aquatic vessels, or any types of vehicles in any environment), wildlife monitoring for conservation and scientific research, coordinated scientific exploration of underwater environments or the surfaces of other planets or moons by fleets of robots, and any kind of collaborative object tracking, among other examples.

The sensor agents (hereafter "sensor agents" or "agents") may be stationary or mobile (e.g., robots) and may include a mix of different types of sensor agents. The sensor agents may be outdoors (e.g., as vehicular traffic), indoors (e.g., in a manufacturing facility) or both (e.g., in electrical power grid infrastructure).

As used herein, "estimates of one or more states of interest" (or "estimates") may include processed determinations, based on sensor data, generated by sensor agents, of any condition of an environment or system, such as temperature, pressure, or speed and direction of the wind local to each sensor agent, or speeds and directions of one or more vehicles or manufacturing robots, or voltage, current, and temperature of electrical grid transmission lines local to each sensor agent in an electrical power infrastructure control context, or speeds and directions of one or more individual animals in a wildlife conservation science context. The estimates may include both filter estimates and prediction estimates. The filter estimates are estimates that a sensor agent generates of an observed state at a time of observation, based on the sensor data. The prediction estimates are estimates of a predicted future state, based on the filter estimates and predictive modeling. A sensor agent may generate prediction estimates for a future time corresponding to an intended time at which the sensor agent will take a subsequent set of sensor readings, with which to generate a subsequent set of filter estimates.

The network of sensor agents or multi-agent network may be sparsely disbursed, such that individual sensor agents may tend to have a low density of neighboring sensor agents, in some examples. In some examples, each sensor agent may typically be in communication range of only one, two, three, or four other sensor agents. In some examples, each sensor agent may typically be in communication range of any other numbers of sensor agents. Various examples may include any arbitrary number of sensor agents, such as thousands of sensor agents, millions of sensor agents, or any other number of sensor agents. Various examples may use large numbers, such as in the millions, of relatively inexpensive sensor agents, which may have significant noise in their data and thus in the estimates they generate, but systems and methods of this disclosure may be well-suited for compensating for noisy individual estimates and arriving at overall accurate global consensus values. Various examples may also use expensive, sophisticated sensor agents, such as automobiles or aircraft that function as sensor agents of this disclosure, which may employ relatively sophisticated and high-signal-to-noise ratio (SNR) sensors.

Aspects of this disclosure provide novel algorithms that fuse the concepts of consensus and innovations. Aspects of this disclosure introduce a definition of distributed observability, which enables novel algorithms, and which enables a more generalized assumption than the conventional combined assumptions of global observability and connected network. Aspects of this disclosure include directed optimal gain matrices, designed from first principles, such that the mean-squared error of estimation is minimized at each of an arbitrarily large number of sensor agents, and a distributed version of an algebraic Riccati equation is derived for computing the gains.

Aspects of this disclosure are directed to a novel general and robust distributed state estimation algorithm. Aspects of this disclosure may be considered to provide a counterpart to a Kalman filter in a distributed processing context, that is as general and robust in a distributed processing context as a Kalman filter is in a centralized processing context. Aspects of this disclosure are directed to novel frameworks and algorithms that address gaps in conventional distributed filtering and prediction. In an example algorithm of this disclosure, the consensus on the state estimates is treated as innovations, and the example algorithm may use gain matrices in accordance with treating the consensus on the state estimates as innovations. Such optimal gains may yield field estimates with minimum mean-squared error (MMSE) at each agent under an assumption of distributed observability at each agent. Aspects of this disclosure use a new definition of distributed observability that performs equivalently whether the communication graph is directed or undirected and does not require the graph to be connected. Aspects of this disclosure use a System-Observation-Communication Model framework, as described below.

Aspects of this disclosure include a distributed framework for time-series forecasting by a dynamical system that includes a multi-agent network of local sensor agents which may function as filters and predictors. Each of the local sensor agents may have access to local observations only, and may be able to transmit and exchange its own state estimates with its neighboring sensor agents, in various examples. The sensor agents may transmit their estimates and refrain from transmitting the underlying data they collect and on which they base their estimates, in various examples. By doing so, the sensor agents may estimate, track, and predict a global time-varying state of the environment they cover.

The underlying data collected by the sensor agents may have any of a wide range of noise and of SNR. The noise in the data may be carried forward as noise in the estimates generated by the individual agents, and as noise in the global time-varying state. The overall network of sensor agents may compensate for this noise and may exhibit emergent behavior in using the overall collection and interchange of estimates of the many sensor agents to converge on consensus values more consistently accurate than would be possible with any one of the individual sensor agents, in various examples.

Aspects of this disclosure include inventive model design, communication protocols, and update rules, which may guarantee that the predictors come to a consensus asymptotically and perform better than any of the individual local predictor (working on its own). The overall net performance of the network of sensor agents may asymptotically approach a theoretical ideal upper bound of consistently accurate performance (or a lower bound of mean squared error) of a centralized predictor that has access to all the observations of the entire network of sensor agents at all times.

Aspects of this disclosure may use underlying distributed learning algorithms and engineering customized network architectures with sensor agents functioning as smart nodes of a network, as opposed to merely scaling up or speeding up artificial intelligence (AI) processing tasks by parallel data processing. A distributed learning algorithm of this disclosure may comprise an algorithm for distributed detection and state estimation, or distributed detecting and generating of estimates of state, for a system or environment of interest, by a multi-agent network of distributed sensor agents of this disclosure, in various examples. A smart network of sensor agents of this disclosure enables knowledge integration without sharing data, by sensor agents instead sharing estimates and predictions they generate based on data, in various examples, thus naturally enabling compliance with any applicable laws, regulations, and requirements for protecting privacy. A smart network of sensor agents of this disclosure reduces computation and communication bottlenecks and overload typical of a centralized processing system attempting to handle observations and predictions for a large, complex system or environment, in various examples. A smart network of sensor agents of this disclosure provides robustness to failures and attacks, is naturally scalable to larger sensor agent networks, and is naturally extendable to growing network size.

Various examples are directed to a computer-implemented method for providing a distributed model fusion for a network of multiple sensor agents that function as trusted network nodes without using a centralized information and prediction processing fusion center. Providing a distributed model fusion for a multi-agent network may include generating a distributed state estimation over a multi-agent network of sensor agents, wherein each sensor agent in the multi-agent network has access to its own data and can share its local estimates with neighboring sensor agents. Various examples further include sensor agents, in response to detecting an interruption (e.g., wherein one or more of the sensor agents of the multi-agent network are under attack, or experience a temporary connection failure), ensuring that processing state predictions by the remaining connected sensor agents continues without interruption. Various examples further include, in response to one or more of the sensor agents experiencing the interruption and disconnection from the network, the one or more disconnected sensor agents and neighboring connected sensor agents proximate to the one or more disconnected sensor agents reconnecting and re-establishing communication with each other, thereby reconnecting the one or more disconnected sensor agents to the multi-agent network, and the one or more disconnected sensor agents and neighboring connected sensor agents resuming exchanging estimates and parameters with each other. Various examples further include avoiding communication and computational processing bottlenecks and overhead at a centralized information and prediction processing fusion center, or when deployed over a large geographical area.

Implementations of this disclosure are necessarily rooted in computer technology. For example, steps of detecting, by a processor set of a first sensor agent, sensor data from one or more sensors comprised in the first sensor agent; determining, by the processor set, an own series of estimates, based on the sensor data; transmitting, by the processor set, the own series of estimates; receiving, by the processor set, at least one additional series of estimates from one or more additional sensor agents; and restoring, by the processor set, in response to detecting that a second sensor agent of the one or more additional sensor agents has become disconnected and then re-connected, the transmitting of the series of estimates to the second sensor agent and the receiving of the series of estimates from the second sensor agent, are necessarily computer-based and cannot be performed in the human mind. Further aspects of the present disclosure are beyond the capability of mental effort not only in scale and consistency, such as by millions or an arbitrarily high number of individual sensor agents working collaboratively with each other, but also technically and categorically, and may enable realtime characterization and prediction of states of an arbitrarily large and complex system or environment, in ways definitively beyond the capability of human minds unaided by computers. Further, aspects of this disclosure provide technological improvements and technological solutions to persistent, complex problems and challenges in conventional distributed linear filtering and prediction. For example, aspects of this disclosure may ensure generalized and robust distributed linear filtering and prediction of arbitrarily high size and complexity. Aspects of this disclosure may ensure achieving more accurate and more robust performance, higher security, and higher-performing avoidance of computing and communication bottlenecks and downtime, in a wide range of important and sophisticated applications. Such applications may include monitoring and controlling manufacturing facilities, monitoring, and controlling the flow of vehicular traffic and collision avoidance, and monitoring and controlling electrical power grids to deliver electrical power reliably and efficiently, in ways that may be categorically beyond the capabilities of conventional systems.

As one example application of generalized and robust distributed linear filtering and prediction by multiple sensor agents of this disclosure, in a vehicle traffic load-balancing and collision avoidance application, each of at least some vehicles in a vehicle traffic system (e.g., automobiles on roads of a city) may be configured to function as sensor agents of this disclosure. In this traffic network, each of the car sensor agents may detect, estimate, and predict states for themselves (e.g., their own cars), each other (e.g., each car's proximate cars), and the environment (e.g., road boundaries, stop signs, traffic light states, proximate bicyclists and pedestrians), share those state estimates with each other, and each use their own and each other's state estimates to generate consensus estimates to balance traffic and to avoid collisions, even while some cars continuously leave the traffic system and other new cars continuously join the traffic system, in ways beyond the capabilities of each car's own on-board computers acting alone to load-balance traffic or to avoid collisions, and in ways beyond the accuracy and speed and capability of even an unrealistically and arbitrarily large number of human personnel trying to monitor the same conditions throughout the vehicular traffic of the city and constantly sharing observations with each other and trying to constantly update a common consensus. In another example application of generalized and robust distributed linear filtering and prediction by multiple sensor agents of this disclosure, an electrical power generating and distributing context may include or be attended by a network of sensor agents, potentially in a variety of formats, with some stationary, some implemented as ground-roving robots, some implemented as airborne robots, and some implemented as aquatic robots (e.g., in aquatic wind farms and aquatic solar farms), which regularly detect and generate state estimates to monitor relevant process conditions (e.g., wind speed at each of many locations, solar intensity at each of many locations, electrical power, current, voltage, and transmission efficiency at each of many locations, assurance of human operator safety conditions at each of many locations), regularly share their state estimates with each other to generate consensus estimates, and output their consensus estimates, which electrical infrastructure systems may use, such as to regularly tune operating conditions to efficiently meet system demand, and to provide safety alerts. Because of the distributed nature of the sensor agents in this electrical power infrastructure network, the overall functioning of the multi-agent network and the robust and accurate generating of the consensus state estimates of the relevant states throughout the electrical power infrastructure may continue unabated and with little or no loss of effectiveness and predictive power, and keep the electrical power infrastructure running smoothly and delivering power efficiently and reliably, even if or when even a significant proportion of the individual sensor agents are taken offline, by any effect, whether for maintenance, due to a storm or an accident, or even due to attacks or malicious interference, and in ways categorically beyond the accuracy and speed and capability of even an unrealistically and arbitrarily large number of human personnel trying to monitor the same conditions throughout the electrical power infrastructure and constantly sharing observations with each other and trying to constantly update a common consensus.

To the extent that implementations of the invention might prospectively collect, store, or employ personal information provided by, or obtained from, individuals (for example, any personal information that may be incidentally apparent from observations and predictions by a distributed multi-agent network, such as routes driven in cars functioning as sensor agents), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 depicts a computing environment 100 in accordance with aspects of the present invention. Computing environment 100 contains an example of an environment for the execution of at least some of the computer code involved in performing the inventive methods, such as distributed estimate generating code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 depicts a block diagram of an exemplary environment 205 in accordance with aspects of the present invention. In embodiments, environment 205 includes sensor agents 201A, 201B, 201C, and 201D ("sensor agents 201"), which each implement a sensor agent of this disclosure, and implement example distributed estimate generating code 200 of this disclosure, as introduced above. Sensor agents 201 may be implemented in a variety of configurations for implementing, storing, running, and/or embodying distributed estimate generating code 200. Sensor agents 201 may each comprise one or more instances of computer 101 of FIG. 1, in various examples. Sensor agents 201 may each comprise a processor set 220, one or more sensors of any kind in a sensor set 225, and one or more data transmission and reception components in a network module 215. Sensor agents 201 may each be an implementation of client computer 101, end user device 103, or remote server 104 as described above with regard to FIG. 1. Processor set 220 may be an implementation of processor set 110 as described above with regard to FIG. 1. Network module 115 may be an implementation of network module 115 as described above with regard to FIG. 1. Sensor set 215 may be an implementation of peripheral device set 124 or IoT sensor set 125 as described above with regard to FIG. 1. Sensor set 225 may include any one or more of cameras, video cameras, microphones, motion sensors, infrared detectors, ultraviolet detectors, radars, lidars, thermometers, magnetic sensors, tactile sensors, pressure sensors, X-ray detectors, gamma ray detectors, mass spectrometers, or any other kind of sensors, in various examples. Sensor agents 201 in various examples may be representative of thousands or millions of identical or heterogeneous sensor agents, and may comprise a cloud-deployed computing configuration, comprising processing devices, memory devices, and data storage devices dispersed across any kind of system or environment of arbitrarily large scale, and with various levels of networking connections, such that any or all of the data, code, and functions of distributed estimate generating code 200 may be distributed across this cloud computing environment. Distributed estimate generating code 200, sensor agents 201, and/or environment 205 may thus constitute, comprise, and/or be considered a distributed estimate generating system, and may comprise and/or be constituted of one or more software systems, a combined hardware and software system, one or more hardware systems, components, or devices, one or more methods or processes, or other forms or embodiments. Environment 205 may also comprise a system or environment to be monitored by sensor agents 201, such as a vehicular traffic system or an electrical power generating and/or distributing system as described above, or any other system or environment, in various examples.

In other examples, sensor agents 201 may comprise any of a wide variety of sensor, computing, and processing system configurations, any of which may implement, store, run, and/or embody distributed estimate generating code 200. Distributed estimate generating code 200 may interact via network system 219 with any other proximate or network-connected computing systems to distributed estimate generating code 200.

In embodiments, sensor agents 201 of FIG. 2, and any one or more computing devices or components thereof, comprise distributed estimate generating code 200. In various embodiments, distributed estimate generating code 200 comprises sensor data detecting module 202; estimate determining module 204; estimate transmitting module 206; estimate receiving module 208; and connection restoring module 210, each of which may comprise modules of the code of block 200 of FIG. 1. Such modules may include routines, programs, objects, components, logic, data structures, and so on that perform particular tasks or implement particular data types that the code of block 200 uses to carry out the functions and/or methodologies of embodiments of the invention as described herein. These modules of the code of block 200 are executable by the processing circuitry 120 of FIG. 1 to perform the inventive methods as described herein. Distributed estimate generating code 200 and/or sensor agents 201 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

FIG. 3 depicts a flowchart of an exemplary method 300 in accordance with aspects of the present invention. Steps of the method may be carried out by any of sensor agents 201 in the environment of FIG. 2 and are described with reference to elements depicted in FIG. 2.

At step 310, distributed estimate generating code 200 detects sensor data from one or more sensors comprised in a first sensor agent (e.g., via sensor data detecting module 202 of FIG. 2), in various examples. In embodiments, and as described with respect to FIG. 2, at step 320, distributed estimate generating code 200 determines an own series of estimates, based on the sensor data (e.g., via estimate determining module 204 of FIG. 2). At step 330, distributed estimate generating code 200 transmits the own series of estimates (e.g., via estimate transmitting module 206 of FIG. 2). At step 340, distributed estimate generating code 200 receives at least one additional series of estimates from one or more additional sensor agents (e.g., via estimate receiving module 208 of FIG. 2). At step 350, distributed estimate generating code 200 restores, in response to detecting that a second sensor agent of the one or more additional sensor agents has become disconnected and then re-connected, the transmitting of the series of estimates to the second sensor agent and the receiving of the series of estimates from the second sensor agent (e.g., via connection restoring module 210 of FIG. 2). At step 360, distributed estimate generating code 200 outputs, based on the own series of estimates and the additional series of estimates, a series of consensus estimates, e.g., as an output of distributed estimate generating code 200 of FIG. 2, and may also be an output of estimate transmitting module 204 of FIG. 2, and in parallel with, overlapping, prior to, or in any order with steps 330 and 350, in some examples.

Figure 4:
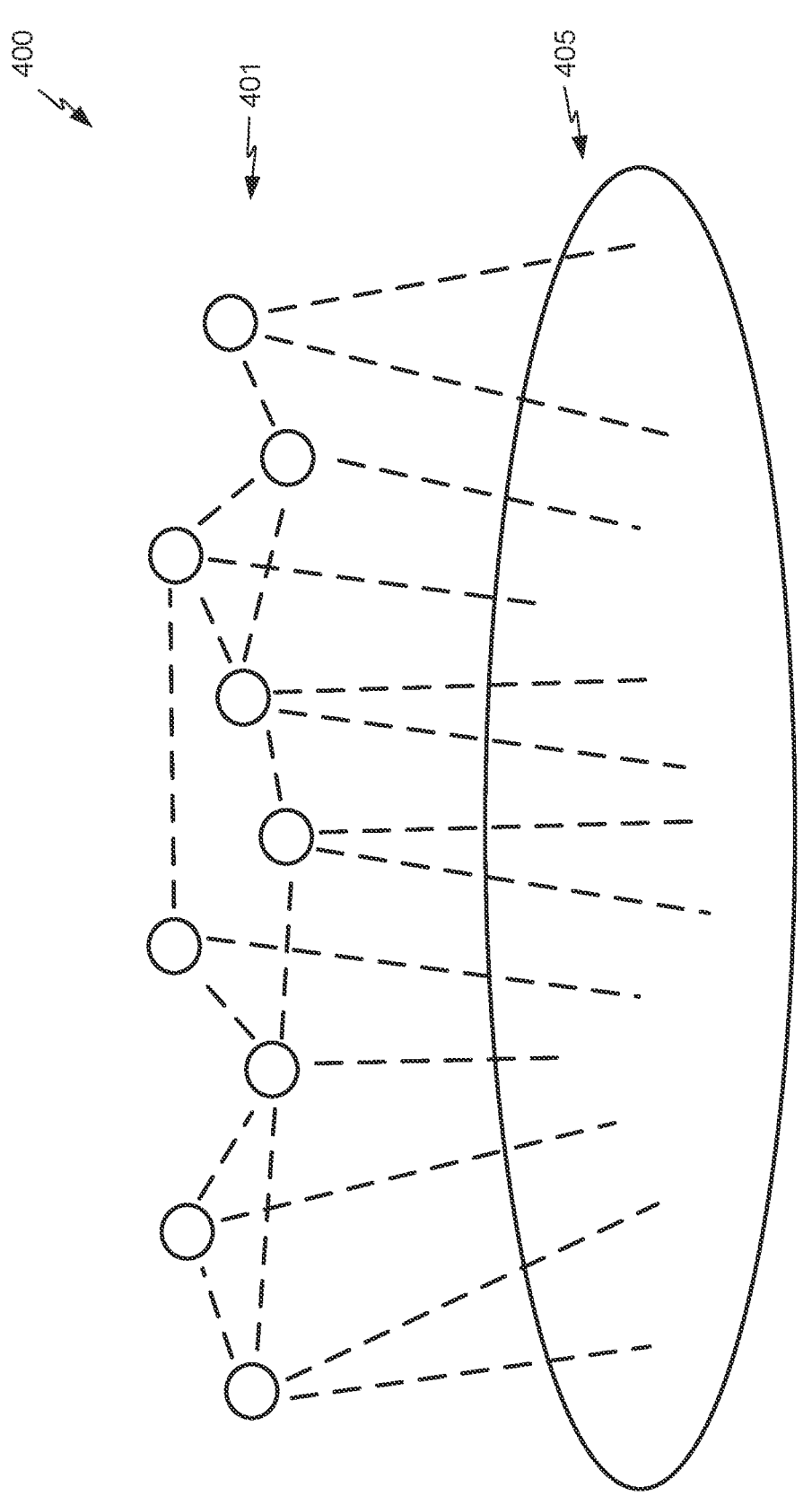
FIG. 4 depicts an illustrative portion of a multi-agent network of sensor agents detecting conditions of a random dynamical environment, and generating and sharing estimates and predictions regarding the environment in accordance with aspects of the present invention.

FIG. 4 depicts an illustrative portion of a multi-agent network 400 of sensor agents 401 detecting conditions of a random dynamical environment 405 and generating and sharing estimates and predictions regarding the environment in accordance with aspects of the present invention. Sensor agents 401 may be implementations of sensor agents 201 of FIG. 2 and may each perform method 300 of FIG. 3. Multi-agent network 400 provides a generalized and robust system for observing and making predictions about random dynamical systems and environments, such as a vehicular traffic system or an electrical power generating and distributing system as described above, with consistent accuracy.

Multi-agent network 400 transcends various shortcomings of conventional distributed estimation and prediction systems, including stricter conditions for distributed observability and connected network, network tracking capacity for estimating unstable systems, and optimal gain matrix design considering cross error covariances. That is, typical conventional distributed estimation systems require stricter assumptions on the local observation model or the communication network among the agents, for example neighborhood observability or an undirected connected graph. In practical distributed settings, these assumptions become a bottleneck. In other conventional distributed estimation systems, there is an upper limit on the degree of instability on the system dynamics that a given observation-network model can handle with bounded mean-squared error (MSE). Such systems become unusable in distributed process control domains where the underlying systems are inherently unstable and need to be stabilized by appropriate control input. If the estimation algorithm fails to track the unstable system, then the design of a stabilizable control input becomes infeasible. Another substantial gap in conventional distributed estimation systems is in the optimality of the distributed state estimates which leverage the maximum information available from the local observations and the estimates obtained from neighbors. Conventional distributed estimation systems fail to provide the optimal gain matrix design such that the algorithm yields minimum MSE estimates.

Multi-agent network 400 is generalized and robust in part by overcoming conventional shortcomings such as these. Multi-agent network 400 further provides generalized and robust inventive advantages in part by using a System-Observation-Communication Model Framework, in various examples, as described as follows.

Multi-agent network 400 follows a discrete-time, linear, and time-invariant state-space model:

$$x_k = Fx_{k-1} + w_{k-1}, \qquad \text{(Equation 1)}$$

where $x_k \in \mathbb{R}^n$ is the dynamic random state vector, at each integer time index k, $F \in \mathbb{R}^{n \times n}$ is the state transition matrix, $w_k \in \mathbb{R}^n$ is the system noise at all time t=kT where T is the discrete-time step size and k is the same integer time index. The system noise is white Gaussian noise with zero mean and covariance matrix $Q_k$, i.e., $w_k \sim \mathcal{N}(0, Q_k)$. The initial condition of the system at a selected time 0, $x_0$, is also Gaussian, and follows:

$$x_0 \sim \mathcal{N}(\bar{x}_0, P_0^+).$$

Multi-agent network 400 comprises m sensor agents 401 (e.g., where m may be in the tens, hundreds, thousands, millions, or any number) observe the dynamic random state of environment 405. Environment 405 may comprise any system or environment to be monitored by sensor agents 401, such as a vehicular traffic system or an electrical power generating and/or distributing system as described above, or any other system or environment, in various examples. Each sensor agent 401, of index i, may observe one or more state variables, as an example of detecting step 410 as described above, and make low dimensional measurements $z_{i,k} \in \mathbb{R}^{p_i}$, as an example of detecting step 410 and/or of step 320 of determining an own series of estimates based on the sensor data as described above, and such that $p_i \ll n$, $\forall i=1, \ldots, m$. Sensor agents 401 transmit their own series of estimates, in an example of step 330 as described above, and receive each other's estimates, as an example of step 340 as described above, and thereby share their observations with each other, and with one or more external output nodes, in an example of outputting step 360 as described above. Any of sensor agents 401 may also serve as an output node that can be read by an authorized user or any other authorized device or communication node, such that outputting in accordance with step 360 as described above is not necessarily at all separate from transmitting in accordance with step 330 as described above, in various examples. Sensor agents 401 also re-connect and restore connections with newly introduced and newly re-connecting sensor agents 401, in an example of step 350 as described above. Sensor agents 401 perform these transmitting, receiving, connection restoring, and outputting steps (in examples of steps 330, 340, 350, and 360 as described above) in a communication layer, e.g., a network layer or cyberspace layer, which may use advanced network communication technologies, layers, and protocols, and which may be represented by a linear and time-invariant model:

$$z_{i,k} = H_i x_k + v_{i,k}, i = 1, \ldots, m \qquad \text{(Equation 2)}$$

where $H_i \in \mathbb{R}^{p_i \times n}$ is the measurement matrix and $v_{i,k} \in \mathbb{R}^{p_i}$ is the measurement noise. The measurement noise, at each sensor agent 401 of index i, is also white Gaussian noise with zero mean and covariance matrix $R_{i,k}$, i.e., $v_{i,k} \sim \mathcal{N}(0, R_{i,k})$. The system noise, the measurement noise, and the initial condition $\{\{w_k\}, \{v_{i,k}\}, x_0\} \forall i$, $k \geq 0$ are uncorrelated random sequences.

Sensor agents 401 (hereafter "sensor agents" or "agents" interchangeably) exchange their measurements and current estimates with their neighbors and with any separate output nodes via the network layer (in examples of any of steps 330, 340, 350, and 360 as described above). Formally, the sensor agent communication network is represented by a simple (no self-loops nor multiple edges) and directed graph $\mathcal{G} = (\mathcal{V}, \varepsilon)$, where $\mathcal{V} = \{i : i = 1, \ldots, m\}$ is the set of sensor agents and $\varepsilon = \{(i, j): \exists$ an edge $j \rightarrow i\}$ is the set of local communication channels among the sensor agents 401. Multi-agent network 400 may use a directed graph (one-way communications, in examples of any of steps 330, 340, 350, and 360 as described above) in some examples, which means that its algorithm is easily extendable to undirected graphs (two-way communications, in examples of any of steps 330, 340, 350, and 360 as described above) (while the reverse is not always true). The adjacency matrix of $\mathcal{G}$ is denoted by $\mathcal{A} = [a_{ij}] \in \mathcal{R}^{m \times m}$, where $$a_{ij} = \begin{cases} 1, & \text{if } \exists \text{ and edge } j \rightarrow i \\ 0, & \text{otherwise.} \end{cases} \qquad \text{(Equation 3)}$$

The communication network among multi-agent network 400 may be treated as likely sparse and time-invariant, in various examples. For each agent 401 of index i, open and closed neighborhoods of proximate agents 401 may be defined as:

$$\Omega_i = \{j | (i, j) \in \varepsilon\} \qquad \text{(Equation 4)}$$

$$\overline{\Omega}_i = \{i\} \cup \{j | (i, j) \in \varepsilon\} \qquad \text{(Equation 5)}$$

As in the case of a classical optimal Kalman filter, each agent 401 of index i in the framework knows the system model, F and $Q_k$, the initial condition statistics, $\bar{x}_0$ and $$P_0^+,$$

the parameters of its own and its neighbors' measurement models, $\{H_j, R_{j,k} : j \in \overline{\Omega}_i\}$ (which sensor agents 401 may use in determining estimates in accordance with step 420 as described above). In the distributed setting, each agent 401 also knows the communication network model, $\mathcal{G}$ along with the adjacency matrix $\mathcal{A}$ describing the proximity of nearby fellow sensor agents 401 (which sensor agents 401 may use in performing examples of any of steps 330, 340, 350, and 360 as described above). The time-invariant state-space is chosen for notational simplicity. All the derivations, assumptions and the results in this disclosure also hold for a time-varying state-space model ($F_k$, $H_{i,k}$, $R_{i,k}$, $Q_k$), which sensor agents 401 may also use in performing any of the above steps, in various examples.

Further, the present analysis remains the same whether the input to the system $u_k$, the control matrix $C_k$, and the system noise matrix $\Phi_k$ are excluded or included. A complete time-varying state-space equation may be set forth as:

$$x_k = F_{k-1} x_{k-1} + C_{k-1} u_{k-1} + \Phi_{k-1} w_{k-1} \qquad \text{(Equation 6)}$$

$$z_{i,k} = H_{i,k} x_k + v_{i,k}, i = 1, \ldots, m.$$

Multi-agent network 400 enables distributed observability, in performing any or all of the steps of method 300 as described above. The concept of distributed observability is introduced as a measure of how well internal states of multi-agent network 400 can be inferred from knowledge of its local measurements and interactions among agents 401 in multi-agent network 400. The concept of distributed observability forms part of the foundation of example distributed estimation algorithms and example designs of optimal gain of this disclosure.

Multi-agent network 400 may model a state-space-network representation of the physical system and its observation and communication exchange. The local observability matrix $G_i \in R^{np_i \times n}$ and the global observability matrix $$G \in \mathcal{R}^{(n \sum_{i=1}^m p_i) \times n}$$

of multi-agent network 400 may be denoted by:

$$G_i = \begin{bmatrix} H_i \\ H_i F \\ H_i F^2 \\ \vdots \\ H_i F^{n-1} \end{bmatrix}, \quad \forall i \in V; \qquad \text{(Equation 7)}$$

$$G = \begin{bmatrix} G_1 \\ G_2 \\ \vdots \\ G_m \end{bmatrix}$$

A connectivity matrix $\mathcal{A}$ of multi-agent network 400 may be defined as:

$$\tilde{A} = I_m + A + A^2 + \ldots + A^{m-1} \qquad \text{(Equation 8)}$$

The element $[\mathcal{A}^q]_{i,j}$ of the matrix $\mathcal{A}^q$ $\forall q \in \mathbb{Z}^+$ gives the number of directed walks of length q from an agent j to another agent i of multi-agent network 400. Then, the connectivity matrix is a non-negative matrix, $\mathcal{A} \geq 0$, and its elements $[\mathcal{A}]_{i,j} = \tilde{a}_{i,j}$ denote the total number of walks (of any length<m) from node j to node i, where each sensor agent 401 is a node in multi-agent network 400. That is, there is no limit to the information-sharing among sensor agents 401 of multi-agent network 400, and sensor agents 401 may iteratively relay estimates among each other, up to and including each sensor agent 401 receiving estimates from all other sensor agents 401 in multi-agent network 400, or with estimates ultimately shared among any lower proportion of sensor agents 401, in performing any or all of the steps of method 300 as described above, in various examples.

Thus, each sensor agent 401 may relay a transmission of each or at least some series of estimates it receives from its proximate or neighboring additional sensor agents within transmission connectivity range, as an example of performing step 340 as described above. Each sensor agent may determine, based on its own series of estimates and the additional series of estimates it receives from other sensor agents 401, including series of estimates it may receive in relay via its neighboring sensor agents from farther sensor agents that are distributed farther afield, a series of consensus estimates, as an example of performing step 360 as described above. Each sensor agent 401 may thus function as an independent node of multi-agent network 400 that performs generating of consensus estimates, as an example of performing step 360 as described above.

If there exist i, j such that $\tilde{a}_{i,j} = 0$, that would correspond to a context in which there doesn't exist any path from j to i and would imply that the graph is not connected, or in other words, that one or more of sensor agents 401 have become disconnected from the remaining sensor agents 401 and from multi-agent network 400, and may form a separate multi-agent network, at least temporarily, as an example of the becoming disconnected from the network as described above with reference to step 350. In the definition of distributed observability as described below, which multi-agent network 400 uses, at least some of sensor agents 401 continue to function as multi-agent network 400, and any disconnected sets of sensor agents 401 may continue to function as independent multi-agent networks, and continue to perform methods of this disclosure, including all steps of method 300, regardless of whether all sensor agents 401 are connected with each other. Disconnected sensor agents 401 or groups of sensor agents 401 may also subsequently re-connect and restore connections with a main body or any other portion of sensor agents 401 and restore and resume transmitting and receiving estimates among each other, in examples of step 350 as described above.

The agent communication network, i.e., the directed graph, is connected if the connectivity matrix is a positive matrix, i.e., $\mathcal{A} \geq 0$. For a fully connected network, $I_m + \mathcal{A} > 0$. Although conventional distributed estimation typically requires a connected graph of sensor agents 401, a fully connected graph of sensor agents is not a necessary condition for distributed observability as defined herein, and is also not required for example distributed estimation algorithms of this disclosure. In other words, any portion of sensor agents 401 may continue implementing distributed observability and performing any or all methods and method steps of this disclosure, including any or all of method 300 as described above, when or if portions of sensor agents 401 are disconnected from each other, and are not in a fully connected graph.

In other words, any portion of sensor agents 401 may continue to function together as an implementation of multi-agent network 400 without regard for whether and when sensor agents 401 maintain full connectivity among each other. Sensor agents 401 may get disconnected from each other and then re-connect with each other, and adapt accordingly, such as by restoring sharing of estimates with each other in examples of step 350 as described above, and by re-positioning themselves accordingly. Sensor agents 401 may re-position themselves by flying, driving, walking, hopping, swimming, or otherwise propelling themselves to new positions, in various examples. A given sensor agent 401, in response to detecting that a second sensor agent has become disconnected, may re-position itself, such as by re-positioning itself toward a last detected position of the second sensor agent. A sensor agent 401 re-positioning itself may thus also be comprised as part of restoring connectivity in an example of step 350 as described above. A sensor agent 401 re-positioning itself may also include remaining within connectivity or transmission range of at least one other sensor agent of its neighboring sensor agents. A given sensor agent 401 may also, in response to detecting that the second sensor agent has become re-connected, re-positioning itself again, such as to re-position itself away from a detected present position of the second sensor agent, and/or re-positioning itself to a position that increases a local homogeneity of distribution of the first sensor agent, the second sensor agent, and one or more additional proximate sensor agents, to adapt again toward more thorough coverage of the local area. A given sensor agent 401 performing such adaptive re-positioning of itself in response to restoring connectivity with re-connected fellow sensor agents 401 may thus also be comprised as part of performing part of step 350 as described above, in various examples.

For the definition of distributed observability, let the quantity $\tilde{\mathcal{A}}_i$ denote the $i^{th}$ row of matrix $\mathcal{A}$ and the symbol • denote the face-splitting product of matrices (e.g., a transposed Khatri-Rao product). Distributed observability may be defined as follows, which may be designated Definition 1. If the row rank of the distributed observability matrix $\mathcal{O}_i$, defined as:

$$O_i = \tilde{A}_i \bullet G = \begin{bmatrix} \tilde{a}_{i,1} \\ \tilde{a}_{2,1} \\ \vdots \\ \tilde{a}_{i,m} \end{bmatrix} \bullet \begin{bmatrix} G_1 \\ G_2 \\ \vdots \\ G_m \end{bmatrix} = \begin{bmatrix} \tilde{a}_{i,1} \otimes G_1 \\ \tilde{a}_{i,2} \otimes G_2 \\ \vdots \\ \tilde{a}_{i,m} \otimes G_m \end{bmatrix} \quad \text{(Equation 9)}$$

is equal to n, where $$O_i \in \mathcal{R}^{(n \sum_{i=1}^m p_i) \times n},$$

then the system of environment 405 is distributedly observable by multi-agent network 400, or multi-agent network 400 has distributed observability of environment 405, at or by agent 401 with index i. The requirement of invertibility (or full-rank) of the distributed observability Gramian, $$O_i^T O_i,$$

is an equivalent alternative of the distributed observability definition, i.e., rank $$(O_i^T O_i) = n.$$

Distributed observability as thus defined incorporates an assumption which may be designated Assumption 1. The state-space-network model of Equations 1-3 is distributedly observable at or by all agents 401 in multi-agent network 400. This assumption ensures that the distributed estimator of multi-agent network 400 converges with bounded mean-squared error (MSE), and converges quickly, to consensus estimates of the states of interest. This enables multi-agent network 400 to quickly achieve consensus estimates of the states of interest that accumulate all of the signal from as many of agents 401 provided estimates of a given state of interest, while averaging out all of the noise, thus determining estimates of the states of interest with substantially higher SNR than any one of agents 401 is capable of, all of which may be comprised as parts of processing, determining, generating, and outputting consensus estimates, in example implementations of step 360 as described above. There is no requirement for the system of environment 405 to be stable or for multi-agent network 400 to be connected. Each individual agent 401 may perform its own determining, based on its own time series of estimates and the additional time series of estimates, a time series of consensus estimates. The definition of distributed observability and Assumption 1 as described above form foundations of an example distributed estimation algorithm and example optimal gain design of this disclosure as described as follows.

Some examples may also use a slightly weaker criterion defined as distributed detectability. Distributed detectability suffices for convergence of example distributed estimation algorithms of this disclosure, in various examples. Distributed detectability only requires unstable states in environment 405 to be observable.

An example distributed estimation algorithm is described as follows, as parts of processing, determining, generating, and outputting consensus estimates, in example implementations of step 360 as described above. At time k and agent i, the filter and prediction estimates of the system of environment 405 may be denoted by $$\hat{x}_{i,k}^+ \text{ and } \hat{x}_{i,k}^-,$$

respectively, and the filter and prediction error covariance matrices by $$P_{i,k}^+ \text{ and } P_{i,k}^-,$$

respectively. The prediction and filtering updates of the example distributed estimation algorithm by agent i are:

$$\hat{x}_{i,k}^- = F\hat{x}_{i,k-1}^+ \tag{Equation 10}$$

$$P_{i,k}^- = FP_{i,k-1}^+ F^T + Q_k \tag{Equation 11}$$

$$K_{i,k} = \Sigma_{x,y_i} \Sigma_{y_i}^{-1} \tag{Equation 12}$$

$$\hat{x}_{i,k}^+ = \hat{x}_{i,k}^- + \sum_{j \in \Omega_i} B_{i,j,k}(\hat{x}_{j,k}^- - \hat{x}_{i,k}^-) + \sum_{j \in \overline{\Omega}_i} M_{i,j,k}(z_{j,k} - H_j \hat{x}_{i,k}^-) \tag{Equation 13}$$

-continued
$$P_{i,k}^+ = P_{i,k}^- - K_{i,k} \Sigma_{x,y_i}^T \tag{Equation 14}$$

where $K_{i,k} \in \mathbb{R}^{n \times (\Sigma_{i \in \overline{\Omega}_n} p_i + n |\Omega_i|)}$ is the distributed gain matrix. The covariance matrices $\Sigma_{x,y_i}$ and $\Sigma_{y_i}$ are derived in the discussion below of optimal gain design. The local consensus weight matrices, $B_{ij,k} \in \mathbb{R}^{n \times n}$, and the local innovation weight matrices, $M_{ij,k} \in \mathbb{R}$ are obtained from the distributed gain matrix $K_{i,k}$.

Equations 9-13 represent the present example distributed estimation algorithm of this disclosure, which any of sensor agents 401 may calculate and determine as parts of processing, determining, generating, and outputting consensus estimates, in example implementations of step 360 as described above, and where the minimized MSE prediction and filter estimates $$\hat{x}_{i,k}^-$$

and $$\hat{x}_{i,k}^+$$

are conditional:

$$\hat{x}_{i,k}^- = \mathbb{E}\left[x_k | \{z_{j,k-1}\}_{j \in \overline{\Omega}_i}, \{\hat{x}_{j,k-1}^+\}_{j \in \Omega_i}\right] \tag{Equation 15}$$

$$\hat{x}_{i,k}^+ = \mathbb{E}\left[x_k | \{z_{j,k}\}_{j \in \overline{\Omega}_i}, \{\hat{x}_{j,k}^-\}_{j \in \Omega_i}\right] \tag{Equation 16}$$

The filter update algorithm of Equation 12 functionally fuses the concepts of consensus and innovations by treating the consensus on the state estimates as innovations along with the local innovations of a given agent and its neighbor agents. To represent this functionality in a different useful manner, the filter update algorithm of Equation 12 may be rewritten with the local innovation term $y_{i,k}$ at agent i as:

$$\hat{x}_{i,k}^+ = \hat{x}_{i,k}^- + K_{i,j} \underbrace{\begin{bmatrix} z_{j_1,k} - H_{j_1}\hat{x}_{i,k}^- \\ \cdots \\ z_{i_k} - H_i \hat{x}_{i,k}^- \\ \cdots \\ z_{j_{|\overline{\Omega}_i|},k} - H_{j_{|\overline{\Omega}_i|}}\hat{x}_{i,k}^- \\ \hat{x}_{j_1,k}^- - \hat{x}_{i,k}^- \\ \vdots \\ \hat{x}_{j_{|\Omega_i|},k}^- - \hat{x}_{i,k}^- \end{bmatrix}}_{y_{i,k}}, \tag{Equation 17}$$

where $$K_{i,k} = \left[M_{ij_1,k}, \ldots, M_{ii,k}, \ldots, M_{ij_{|\overline{\Omega}_i|},k}, B_{ij_1,k}, \ldots, B_{ij_{|\Omega_i|},k}\right], \tag{Equation 18}$$

$$\{j_1, \ldots, i, \ldots, j_{|\overline{\Omega}_i|}\} = \overline{\Omega}_i$$

and $$\{j_1, \ldots, j_{|\Omega_i|}\} = \Omega_i.$$

The innovation sequences $\{y_{i,k}\}_{\forall i,k \geq 0}$ are Gaussian random vectors, uncorrelated and with zero mean, $\mathbb{E}[y_{i,k}]=0$, $\forall i$, $k \geq 0$. These innovation terms are comprised in the optimal design of the gain matrices, in various examples, as further described below.

Multi-agent network 400 also performs error analysis, which any of sensor agents 401 may also calculate and determine as parts of processing, determining, generating, and outputting own estimates and/or consensus estimates, in example implementations of steps 320 and/or 360 as described above. The predictor and filter error terms, $$\epsilon_{i,k}^- \in \mathbb{R}^n \text{ and } \epsilon_{i,k}^+ \in \mathbb{R}^n,$$

respectively, may be derived for each agent i, as:

$$\epsilon_{i,k}^- = x_k - \hat{x}_{i,k}^- \qquad \text{(Equation 19)}$$

$$\epsilon_{i,k}^+ = x_k - \hat{x}_{i,k}^+ \qquad \text{(Equation 20)}$$

The error processes, $$\epsilon_{i,k}^- \text{ and } \epsilon_{i,k}^+$$

are unbiased, i.e., they are zero mean at all agents 401 and for all time indices, $$\mathbb{E}\left[\epsilon_{i,k}^-\right] = 0 \text{ and } \mathbb{E}\left[\epsilon_{i,k}^+\right] = 0, \forall i, k \geq 0.$$

The error processes follow $$\epsilon_{i,k}^- \sim \mathcal{N}\left(O_n, P_{i,k}^-\right) \text{ and } \epsilon_{i,k}^+ \sim \mathcal{N}\left(O_n, P_{i,k}^+\right).$$

This shows that the distributed prediction estimates $$\hat{x}_{i,k}^-$$

and filtering estimates $$\hat{x}_{i,k}^+$$

provided by this example algorithm are unbiased.

Combining Equations 2 and 16, the innovations may be expanded as:

$$y_{i,k} = \begin{bmatrix} H_{j_1} x_k + v_{j_1,k} - H_{j_1} \hat{x}_{i,k}^- \\ \cdots \\ H_i x_k + v_{i,k} - H_i \hat{x}_{i,k}^- \\ \cdots \\ H_{j_{|\overline{\Omega}_i|}} x_k + v_{j_{|\overline{\Omega}_i|},k} - H_{j_{|\overline{\Omega}_i|}} \hat{x}_{i,k}^- \\ \hat{x}_{j_1,k}^- - x_k + x_k - \hat{x}_{i,k}^- \\ \vdots \\ \hat{x}_{j_{|\overline{\Omega}_i|},k}^- - x_k + x_k - \hat{x}_{i,k}^- \end{bmatrix} = \qquad \text{(Equation 21)}$$

$$\underbrace{\begin{bmatrix} H_{j_1} \\ \cdots \\ H_i \\ \cdots \\ H_{j_{|\overline{\Omega}_i|}} \\ 0_{n \times n} \\ \vdots \\ 0_{n \times n} \end{bmatrix}}_{\tilde{H}_i} \epsilon_{i,k}^- + \underbrace{\begin{bmatrix} v_{j_1,k} \\ \cdots \\ v_{i,k} \\ \cdots \\ v_{j_{|\overline{\Omega}_i|},k} \\ \epsilon_{i,k}^- - \epsilon_{j_1,k}^- \\ \vdots \\ \epsilon_{i,k}^- - \epsilon_{j_{|\overline{\Omega}_i|},k}^- \end{bmatrix}}_{\delta_{i,k}}$$

where $\tilde{H}_i \in \mathbb{R}^{(\Sigma_{i \in \overline{\Omega}_n} p_i + n |\Omega_i|) \times n}$ are the local innovation matrices and the $\delta_{i,k} \in \mathbb{R}^{(\Sigma_{i \in \overline{\Omega}_n} p_i + n |\Omega_i|)}$ are the local innovation noise for each agent i. In compact notation, the dynamics of the local innovations are represented by:

$$y_{i,k} = \tilde{H}_i \epsilon_{i,k}^- + \delta_{i,k}, \forall i, k \geq 0 \qquad \text{(Equation 22)}$$

The local innovation noise $\delta_{i,k}$ are Gaussian random vectors with zero mean, and the variance may be denoted by $\Delta_{i,k}$, i.e., $\delta_{i,k} \sim \mathcal{N}(0, \Delta_{i,k})$. Using Equations 1, 9, 16, and 20 on the predictor and Equations 18 and 19 for the filter error, their dynamics take the form:

$$\epsilon_{i,k}^- = F x_{k-1} + w_{k-1} - F \hat{x}_{i,k-1}^+ \qquad \text{(Equation 23)}$$

$$= F \epsilon_{i,k-1}^+ + w_{k-1}$$

$$\epsilon_{i,k}^+ = x_k - \hat{x}_{i,k}^- - \mathcal{K}_{i,k} y_{i,k} \qquad \text{(Equation 24)}$$

$$= \epsilon_{i,k}^- - \mathcal{K}_{i,k} \tilde{H}_i - \mathcal{K}_{i,k} \delta_{i,k}$$

$$= \left(I_n - \mathcal{K}_{i,k} \tilde{H}_i\right) \epsilon_{i,k}^- - \mathcal{K}_{i,k} \delta_{i,k}$$

$$\epsilon_{i,k}^+ = \left(F - \mathcal{K}_{i,k} \tilde{H}_i F\right) \epsilon_{i,k-1}^+ + \left(I_n - \mathcal{K}_{i,k} \tilde{H}_i\right) w_{k-1} - \mathcal{K}_{i,k} \delta_{i,k}$$

Given that the predictor and filter errors are zero-mean, the recursive updates of the evolution of their covariances, using Equations 10 and 13, are derived as follows:

$$P_{i,k}^- = \mathbb{E}\left[\epsilon_{i,k}^- \epsilon_{i,k}^{-T}\right] = \mathbb{E}\left[\left(F \epsilon_{i,k-1}^+ + w_{k-1}\right)\left(F \epsilon_{i,k-1}^+ + w_{k-1}\right)^T\right] \qquad \text{(Equation 25)}$$

$$= F P_{i,k-1}^+ F^T + Q_k$$

$$P_{i,k}^+ = \mathbb{E}\left[\epsilon_{i,k}^+ \epsilon_{i,k}^{+T}\right] = \mathbb{E}\left[\left(\epsilon_{i,k}^- - \mathcal{K}_{i,k} y_{i,k}\right)\left(\epsilon_{i,k}^- \rightarrow \mathcal{K}_{i,k} y_{i,k}\right)^T\right] \qquad \text{(Equation 26)}$$

$$= P_{i,k}^- - \mathcal{K}_{i,k} \sum_{x,y_i}^T - \sum_{x,y_i} \mathcal{K}_{i,k}^T + \mathcal{K}_{i,k} \sum_{y_i} \mathcal{K}_{i,k}^T$$

$$= P_{i,k}^- - K_{i,k} \sum_{x,y_i}^T$$

The expectations of the cross-terms in Equation 23 are zero. The term $$\mathbb{E}\left[\epsilon_{i,k}^- y_{i,k}^T\right] = \sum_{x,y_i}$$

is shown below in Equation 25. Equation 24 is obtained by substituting $$\mathcal{K}_{i,k} \text{ with } \sum\nolimits_{x,y_i} \sum\nolimits_{y_i}^{-1}.$$

The convergence properties of the distributed estimator of Equations 9-13 may be determined by the dynamics of the filter and prediction error processes of Equations 22 and 21. If the error dynamics are asymptotically stable, then the error processes have asymptotically bounded error covariances that in turn guarantee the convergence of the distributed algorithm. If the dynamics of the filter error processes, $$\epsilon_{i,k}^+ \forall \, i,$$

are asymptotically stable, then the dynamics of the prediction error processes $$\epsilon_{i,k}^+ \forall \, i,$$

are also asymptotically stable.

For the distributed estimator implemented by sensor agents 401 or any subset thereof to converge to consensus estimates as part of outputting consensus estimates in accordance with step 360 with bounded mean-squared error (MSE), the filter error of Equation 22 may be asymptotically stable in various examples, e.g., the spectral radius of the error's dynamics matrix is less than 1: $\rho(\underline{F} - \mathcal{K}_{i,k} \tilde{H}_i F) < 1$. Given that the state-space-network model of Equations 1-3 satisfies the distributed observability criteria of Equation 8, it guarantees that there exist gain matrices $\mathcal{K}_{i,k}$ at each agent i such that $\rho(F - \mathcal{K}_{i,k} \tilde{H}_i F) < 1$. This forms a foundation for a design of optimal gain matrices of various examples of this disclosure, as described as follows.

The optimal gain design may be considered in terms of the stability of the error dynamics. The asymptotic stability of the error dynamics guarantees convergence of the example distributed estimation algorithm of Equations 9-13 and bounded MSE. Aspects of this disclosure further include an aim to design the gain matrices $\mathcal{K}_{i,k}$ such that the MSE is not only bounded but also minimum, in various examples.

Since the zero-mean innovation sequences $\{y_{i,k}\} \forall_{i,k \geq 0}$ are Gaussian and uncorrelated, they are independent random vectors. By applying Gauss-Markov theorem on Equation 17, gain matrices of this disclosure that minimize the MSE of the filter and prediction estimates may be given by:

$$\mathcal{K}_{i,k} = \sum\nolimits_{x,y_i} \sum\nolimits_{y_i}^{-1} \qquad \text{(Equation 27)}$$

where $$\sum\nolimits_{x,y_i} = \mathbb{E}\big[(x_k - \bar{x}_k)y_{i,k}^T\big] = \mathbb{E}\big[(x_k - \hat{x}_{i,k}^- + \hat{x}_{i,k}^- - \bar{x}_k)y_{i,k}^T\big] \qquad \text{(Equation 28)}$$

$$= \mathbb{E}\big[\epsilon_{i,k}^- \epsilon_{i,k}^T\big] = \mathbb{E}\big[\epsilon_{i,k}^-(\tilde{H}_i \epsilon_{i,k}^- + \delta_{i,k})^T\big]$$

$$= P_{i,k}^- \tilde{H}_i^T + \sum\nolimits_{\epsilon_i,\delta_i}$$

and $$\sum\nolimits_{y_i} = \mathbb{E}\big[y_{i,k}^- y_{i,k}^T\big] = \mathbb{E}\big[(\tilde{H}_i \epsilon_{i,k}^- + \delta_{i,k})(\tilde{H}_i \epsilon_{i,k}^- + \delta_{i,k})^T\big] \qquad \text{(Equation 29)}$$

$$= \tilde{H}_i P_{i,k}^- \tilde{H}_i^T + \Delta_{i,k} + \tilde{H}_i \sum\nolimits_{\epsilon_i,\delta_i} + \sum\nolimits_{\epsilon_i,\delta_i} \tilde{H}_i^T.$$

Obtaining Equation 25 uses the fact that $$\mathbb{E}\big[(\hat{x}_{i,k}^- \to \bar{x}_k)y_{i,k}^T\big] = 0.$$

$$\mathbb{E}\big[\epsilon_{i,k}^- v_{j,k}^T\big] = 0 \forall \, j \in \vec{\Omega}_i$$

is used to derive the two covariance quantities and $\Sigma_{\epsilon_i,\delta_i}$ and $\Delta_{i,k}$ as follows:

(Equation 30)

$$\sum\nolimits_{\epsilon_i,\delta_i} = \mathbb{E}\big[\epsilon_{i,k}\delta_{i,k}^T\big]$$

$$= \Big[0_{n,p_{j_1}} \, \cdots \, 0_{n,p_i} \, 0_{n,p_{j_{|\bar{\Omega}_i|}}} \, \vdots \, \big(P_{i,k}^- - P_{i,j_1,k}^-\big) \, \cdots \, \big(P_{i,k}^- - P_{ij_{|\Omega_i|},k}^-\big)\Big]$$

(Equation 31)

$$\Delta_{i,k} = \mathbb{E}\big[\delta_{i,k}\delta_{i,k}^T\big]$$

$$= blkdiag\Big\{blkdiag\{R_{j,k}\}_{j,l \in |\bar{\Omega}_i|}, \big[\big[P_{i,k}^- - P_{ji,k}^- + P_{il,k}^- + P_{jl,k}^-\big]_{j,l \in \Omega_i}\big]\Big\}$$

where "blkdiag" indicates a block-diagonal matrix. With the two expressions $\Sigma_{\epsilon_i,\delta_i}$ and $\Delta_{i,k}$ in Equations 28 and 29, optimal gain matrices of this disclosure for the distributed estimator at each agent may be reformulated as:

$$\mathcal{K}_{i,k} = \Big(P_{i,k}^- \tilde{H}_i^T + \sum\nolimits_{\epsilon_i,\delta_i}\Big) \qquad \text{(Equation 32)}$$

$$\Big(\tilde{H}_i P_{i,k}^- \tilde{H}_i^T + \Delta_{i,k} + \tilde{H}_i \sum\nolimits_{\epsilon_i,\delta_i} + \sum\nolimits_{\epsilon_i,\delta_i} \tilde{H}_i^T\Big)^{-1}$$

The gain matrices may likely be very sparse at each agent, in some examples. To alleviate challenges in tracking of the complete network error covariances of multi-agent network 400, distributed estimate generating code 200 may use a certifiable optimal distributed filter that performs optimal fusion of estimates under unknown correlations by a particular tight Semidefinite Programming (SDP) relaxation. Further, given that the gain matrices do not depend on the measurements, they all can be pre-computed and stored on each agent 401.

Equations 23 and 24 may be combined to get:

$$P_{i,k}^+ = FP_{i,k-1}^+ + Q_k \to \mathcal{K}_{i,k}\big(\sum\big)_{x,y_i}^T \qquad \text{(Equation 33)}$$

Equation 31, once substituted with Equations 26-30 to express in terms of system parameters, may yield a recursive iteration of the filter error covariance matrix which is the distributed version of the discrete algebraic Riccati equation for the example distributed estimation algorithm of this disclosure. The initial condition of the covariances are $$P_{i,0}^+ = P_0^+ \forall \, i \text{ and } P_{ij,0}^+ = P_0^+ \forall \, i, \, j \in \Omega_i.$$

Under Assumption 1 of the distributed observability, the Riccati equation has an asymptotic solution at each agent which is positive definite when started with a symmetric positive semi-definite matrix. This solution, which may be designated by $$P_{i,\infty}^+$$

is the fixed point of Equation 31. For the linear time invariant problems (assuming distributed observability), the steady state filter is asymptotically stable: $\rho(F - \mathcal{K}_{i,\infty}\tilde{H}_iF) < 1$, i.e., the closed loop filter matrix $F - \mathcal{K}_{i,\infty}\tilde{H}_iF$ has all poles inside the unit circle, regardless of whether or not F is asymptotically stable. To save on the storage burden, each sensor agent 401 of index i may use a steady state gain matrix $\mathcal{K}_{i,\infty}$ for some or all of the iterations, in various examples. This may not yield distributed estimates with minimum MSE, but does provide estimates with bounded MSE.

Thus, multi-agent network 400 uses an inventive definition for distributed observability, introduces a new class of distributed state estimation algorithms that treat consensus on neighbors' estimates as innovations, and designs the gain matrices for the distributed estimator such that the algorithm is optimal, i.e., it yields minimum MSE estimates at all agents 401, which any of sensor agents 401 may calculate and determine as parts of processing, determining, generating, and outputting consensus estimates in example implementations of step 360 as described above. Example algorithms, derivations and error analyses of this disclosure resolve challenges related to convergence and optimality of distributed state estimation.

Systems, devices, and methods of this disclosure may further enable sensor agents 401 and multi-agent network 400 to determine and implement advantageous or optimal placement of sensor agents 401 in multi-agent network 400. Systems, devices, and methods of this disclosure may further enable sensor agents 401 and multi-agent network 400 to adapt to failures of one or more of sensor agents 401 or of their communication capabilities by advantageously or optimally rearranging sensor agents 401 to compensate for and adapt to the loss of one or more of sensor agents 401, such as by optimally disbursing some of sensor agents 401 to cover the territory of environment 405 previously covered by the disconnected sensor agents 401, while remaining within connectivity range of multi-agent network 400, that is, of at least one other of the one or more additional sensor agents 401. Systems, devices, and methods of this disclosure may further enable sensor agents 401 and multi-agent network 400 to adapt to one or more disconnected sensor agents 401 coming back online and re-connecting to multi-agent network 400 by restoring sharing estimates between the re-connected sensor agents 401 and by rearranging sensor agents 401 to adapt to the return of the one or more previously disconnected sensor agents 401, such as by returning to a homogenous density or distribution counting the reconnected sensor agents 401 or otherwise re-deploying sensor agents 401 to take advantage of the reconnected sensor agents 401, all of which sensor agents 401 may perform as parts of adapting to and restoring connections among each other as part of implementing step 350 as described above, in various examples.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/ or the service provider can receive payment from the sale of advertising content to one or more third parties.

In still additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

detecting, by a processor set of a first sensor agent in a distributed processing system for making predictions about a random dynamical system, sensor data from one or more sensors comprised in the first sensor agent;

determining, by the processor set, an own series of estimates associated with the random dynamical system using a distributed estimation algorithm, based on the sensor data;

transmitting, by the processor set, the own series of estimates;

receiving, by the processor set, at least one additional series of estimates associated with the random dynamical system from one or more additional sensor agents in the distributed processing system;

restoring, by the processor set, in response to detecting that a second sensor agent of the one or more additional sensor agents has become disconnected and then reconnected, the transmitting of the own series of estimates to the second sensor agent and the receiving of the at least one additional series of estimates from the second sensor agent;

re-positioning, by the processor set, the first sensor agent in response to detecting that the second sensor agent of the one or more additional sensor agents has become disconnected; and outputting, by the processor set, based on the own series of estimates and the additional series of estimates, a series of consensus estimates of the random dynamical system.

2. The method of claim 1, further comprising relaying a transmission of the at least one series of estimates from the one or more additional sensor agents.

3. The method of claim 1, wherein the re-positioning the first sensor agent comprises re-positioning the first sensor agent toward a last detected position of the second sensor agent.

4. The method of claim 3, wherein the re-positioning the first sensor agent further comprises re-positioning the first sensor agent while remaining within connectivity of at least one other sensor agent of the one or more additional sensor agents.

5. The method of claim 1, further comprising, in response to the detecting that the second sensor agent of the one or more additional sensor agents has become re-connected, re-positioning the first sensor agent.

6. The method of claim 5, wherein the re-positioning the first sensor agent comprises re-positioning the first sensor agent away from a detected present position of the second sensor agent.

7. The method of claim 5, wherein the re-positioning the first sensor agent comprises re-positioning the first sensor agent to a position that increases a local homogeneity of distribution of the first sensor agent, the second sensor agent, and the one or more additional sensor agents.

8. The method of claim 1, wherein the own series of estimates comprises a time series of filter estimates of observed states, based on the sensor data, and a time series of prediction estimates of predicted future states, based on the sensor data and on predictive modeling.

9. The method of claim 8, wherein the determining the own series of estimates comprises performing a distributed estimation algorithm to generate prediction updates and filtering updates.

10. The method of claim 9, wherein the determining the own series of estimates further comprises performing error analysis, wherein performing error analysis comprises:

determining a predictor error and a filter error for the first sensor agent;

determining local innovations and local innovation noise for the first sensor agent; and performing recursive updates of the evolution of covariances, wherein a spectral radius of a dynamics matrix of error is less than 1, wherein the first sensor agent and the one or more additional sensor agents form a distributed estimator that converges to consensus estimates, wherein the consensus estimates have bounded mean-squared error (MSE) and the filter error is asymptotically stable.

11. The method of claim 1, wherein determining the own series of estimates further comprises performing an optimal gain design, wherein performing the optimal gain design comprises applying Gauss-Markov theorem, thereby generating gain matrices.

12. The method of claim 11, wherein the performing an optimal gain design further comprises:

using an optimal distributed filter that performs optimal fusion of estimates under unknown correlations by a Semidefinite Programming (SDP) relaxation, which is pre-computed and stored on the first sensor agent; and determining a recursive iteration of a filter error covariance matrix which comprises a distributed version of a discrete algebraic Riccati equation for the distributed estimation algorithm.

13. The method of claim 1, further comprising using the outputted series of consensus estimates for at least one application selected from among the group of: multi-agent control, positioning, navigation, state estimation in electrical power grid infrastructure, spatio-temporal environment monitoring, spatio-temporal field monitoring, connected vehicular network for traffic balancing and collision avoidance, wildlife monitoring, and collaborative object tracking.

14. A computer program product comprising one or more computer readable storage media having program instructions collectively stored on the one or more computer readable storage media, the program instructions executable to:

detect sensor data from one or more sensors comprised in a first sensor agent in a distributed processing system for making predictions about a random dynamical system;

determine an own series of estimates associated with the random dynamical system using a distributed estimation algorithm, based on the sensor data;

transmit the own series of estimates;

receive at least one additional series of estimates associated with the random dynamical system from one or more additional sensor agents in the distributed processing system;

restore, in response to detecting that a second sensor agent of the one or more additional sensor agents has become disconnected and then re-connected, the transmitting of the own series of estimates to the second sensor agent and the receiving of the at least one additional series of estimates from the second sensor agent;

re-position the first sensor agent, in response to detecting that the second sensor agent of the one or more additional sensor agents has become disconnected, wherein the re-positioning the first sensor agent comprises re-positioning the first sensor agent toward a last detected position of the second sensor agent, while remaining within connectivity of at least one other sensor agent of the one or more additional sensor agents; and output, based on the own series of estimates and the additional series of estimates, a series of consensus estimates of the random dynamical system.

15. The computer program product of claim 14, wherein the program instructions are further executable to:

relay a transmission of the at least one series of estimates from the one or more additional sensor agents;

determine, based on the own series of estimates and the additional time series of estimates, a series of consensus estimates.

16. The computer program product of claim 14, wherein the program instructions are further executable to:

in response to the detecting that the second sensor agent of the one or more additional sensor agents has become re-connected, re-positioning the first sensor agent, wherein the re-positioning the first sensor agent comprises re-positioning the first sensor agent away from a detected present position of the second sensor agent, to a position that increases a local homogeneity of distribution of the first sensor agent, the second sensor agent, and the one or more additional sensor agents.

17. A system comprising:

a processor set, one or more computer readable storage media, and program instructions collectively stored on the one or more computer readable storage media, the program instructions executable to:

detect sensor data from one or more sensors comprised in a first sensor agent in a distributed processing system for making predictions about a random dynamical system;

determine an own series of estimates associated with the random dynamical system using a distributed estimation algorithm, based on the sensor data;

transmit the own series of estimates;

receive at least one additional series of estimates associated with the random dynamical system from one or more additional sensor agents in the distributed processing system;

restore, in response to detecting that a second sensor agent of the one or more additional sensor agents has become disconnected and then re-connected, the transmitting of the series of own estimates to the second sensor agent and the receiving of the at least one additional series of estimates from the second sensor agent;

re-position the first sensor agent, in response to detecting that the second sensor agent of the one or more additional sensor agents has become disconnected; and output, based on the own series of estimates and the additional series of estimates, a series of consensus estimates of the random dynamical system.

18. The system of claim 17, wherein the program instructions are further executable to:

relay a transmission of the at least one series of estimates from the one or more additional sensor agents;

determine, based on the own series of estimates and the additional time series of estimates, a series of consensus estimates.

19. The system of claim 17, wherein the program instructions are further executable to:

in response to the detecting that the second sensor agent of the one or more additional sensor agents has become re-connected, re-positioning the first sensor agent, wherein the re-positioning the first sensor agent comprises re-positioning the first sensor agent away from a detected present position of the second sensor agent, to a position that increases a local homogeneity of distribution of the first sensor agent, the second sensor agent, and the one or more additional sensor agents.

20. The system of claim 17, wherein the re-positioning the first sensor agent comprises re-positioning the first sensor agent toward a last detected position of the second sensor agent, while remaining within connectivity of at least one other sensor agent of the one or more additional sensor agents.

\* \* \* \* \*